United States Patent
Kim et al.

(10) Patent No.: US 8,634,366 B2
(45) Date of Patent: Jan. 21, 2014

(54) METHOD AND APPARATUS FOR TRANSMITTING SIGNALS SEGMENTATION

(75) Inventors: Ki Hwan Kim, Anyang-si (KR); Jae Hoon Chung, Anyang-si (KR); Yeong Hyeon Kwon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 192 days.

(21) Appl. No.: 13/139,717

(22) PCT Filed: Nov. 10, 2009

(86) PCT No.: PCT/KR2009/006577
§ 371 (c)(1),
(2), (4) Date: Jun. 14, 2011

(87) PCT Pub. No.: WO2010/098532
PCT Pub. Date: Sep. 2, 2010

(65) Prior Publication Data
US 2011/0261775 A1     Oct. 27, 2011

Related U.S. Application Data

(60) Provisional application No. 61/156,291, filed on Feb. 27, 2009.

(30) Foreign Application Priority Data

Jun. 4, 2009  (KR) .................. 10-2009-0049515

(51) Int. Cl.
| H04W 4/00 | (2009.01) |
| H04B 7/216 | (2006.01) |
| H04J 3/24 | (2006.01) |
| G08C 25/02 | (2006.01) |

(52) U.S. Cl.
USPC ........... 370/329; 370/342; 370/335; 370/349; 370/320; 370/338; 714/748

(58) Field of Classification Search
USPC ......... 370/329, 335, 471, 342, 349, 320, 338; 375/298, 261; 714/748
See application file for complete search history.

(56) References Cited

U.S. PATENT DOCUMENTS

| 8,230,290 B2 * | 7/2012 | Seok et al. ................ 714/748 |
| 2003/0076799 A1 | 4/2003 | Kwak et al. |
| 2003/0123409 A1 | 7/2003 | Kwak et al. |
| 2005/0108610 A1 | 5/2005 | Kim et al. |
| 2008/0225965 A1 | 9/2008 | Pi et al. |
| 2009/0086849 A1 * | 4/2009 | Tsai et al. ................ 375/298 |

FOREIGN PATENT DOCUMENTS

WO     2008114957     9/2008

* cited by examiner

*Primary Examiner* — Asad Nawaz
*Assistant Examiner* — Stephanie Chang
(74) *Attorney, Agent, or Firm* — Lee, Hong, Degerman, Kang & Waimey

(57) ABSTRACT

A method for transmitting a transport block includes segmenting the transport block into code blocks corresponding in number to a multiple of the number of layers to be used for the transmission of the transport block, attaching a Cyclic Redundancy Check (CRC) to the segmented code blocks, sequentially mapping the code blocks to which the CRC has been attached to at least one layer according to a predetermined mapping rule, and transmitting the code blocks.

10 Claims, 8 Drawing Sheets

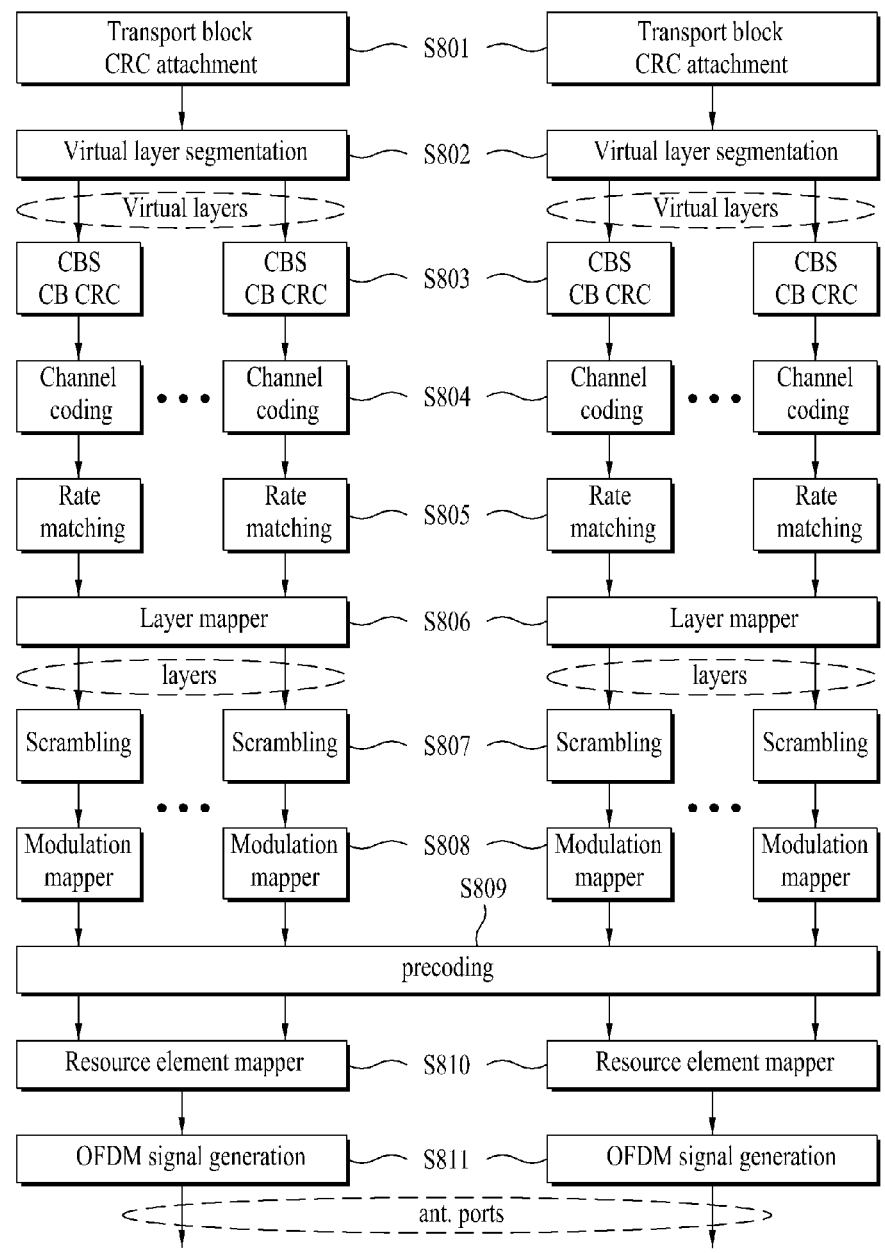

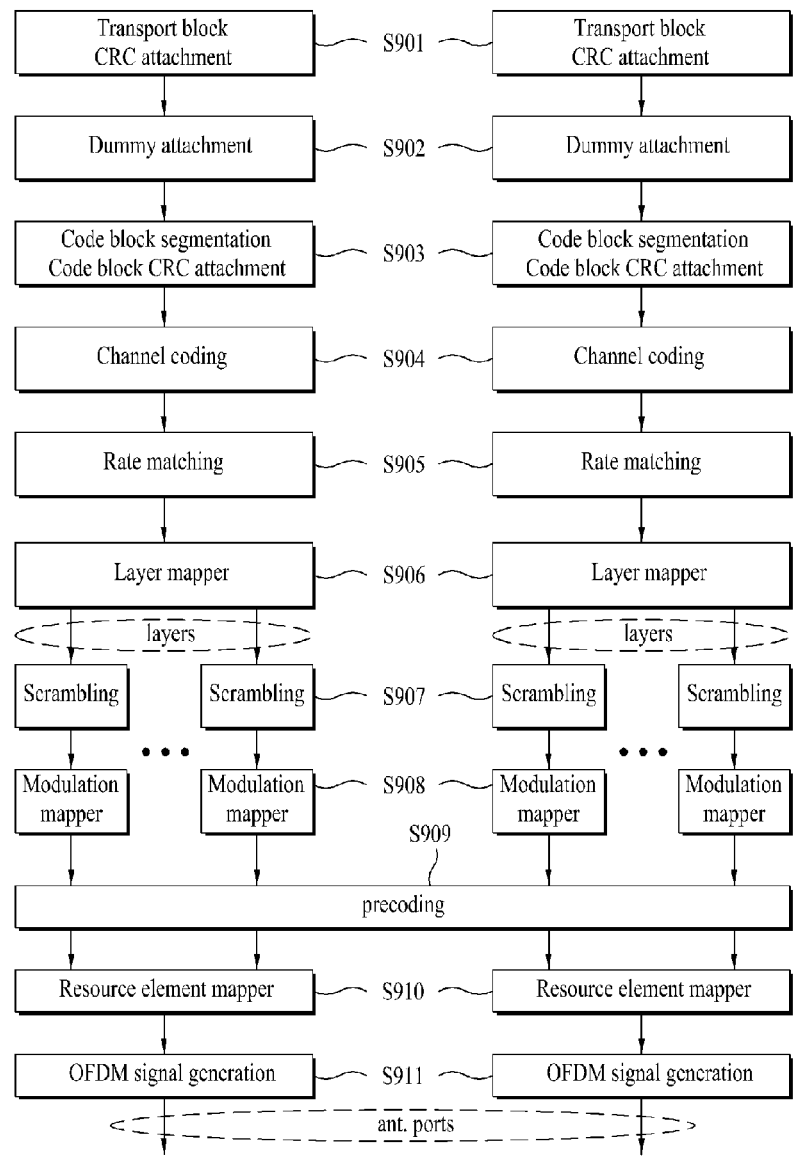

METHOD AND APPARATUS FOR TRANSMITTING SIGNALS SEGMENTATION

CROSS-REFERENCE TO RELATED APPLICATIONS

This application is the National Stage filing under 37 U.S.C. 371 of International Application No. PCT/KR2009/006577, filed on Nov. 10, 2009, which claims the benefit of earlier filing date and right of priority to Korean Patent Application No. 10-2009-0049515, filed on Jun. 4, 2009, and also claims the benefit of U.S. Provisional Application Ser. No. 61/156,291, filed on Feb. 27, 2009, the contents of which are all hereby incorporated by reference herein in their entirety.

TECHNICAL FIELD

The present invention relates to mobile communication technology, and more particularly, to a method and apparatus for transmitting signals.

BACKGROUND ART

In a mobile communication system, a user equipment (UE) may receive information from a base station (eNB) in downlink, and the UE may transmit information in uplink. The information which may be transmitted or received by the UE includes data and a variety of control information. There are various physical channels depending on the kind and use of information transmitted or received by the UE.

FIG. 1 is a view showing physical channels used for a 3$^{rd}$ Generation Partnership Project (3GPP) Long Term Evolution (LTE) system, which is an example of a mobile communication system, and a general signal transmission method using the same.

When a UE is powered on or when the UE newly enters a cell, the UE performs an initial cell search operation such as synchronization with an eNB in step S101. To this end, the UE may receive a Primary Synchronization Channel (P-SCH) and a Secondary Synchronization Channel (S-SCH) from the base station so as to perform synchronization with the eNB, and acquire information such as a cell ID. Thereafter, the UE may receive a physical broadcast channel from the eNB and acquire broadcast information in the cell. Meanwhile, the UE may receive a Downlink Reference signal (DL RS) in the initial cell search step and confirm a downlink channel state.

The UE which completes the initial cell search may receive a Physical Downlink Control Channel (PDCCH) and a Physical Downlink Shared Channel (PDSCH) corresponding to the PDCCH, and acquire more detailed system information in step S102.

Meanwhile, the UE which does not complete the access to the eNB may perform a random access procedure in steps S103 to S106, in order to complete the access to the eNB. To this end, the UE may transmit a feature sequence via a Physical Random Access Channel (PRACH) as a preamble (S103), and may receive a message in response to the random access procedure via the PDCCH and the PDSCH corresponding thereto (S104). In contention-based random access except for handover, a contention resolution procedure including the transmission of an additional PRACH (S105) and the reception of the PDCCH and the PDSCH corresponding thereto (S106) may be performed.

The UE which performs the above-described procedure may then receive the PDCCH/PDSCH (S107) and transmit a Physical Uplink Shared Channel (PUSCH)/Physical Uplink Control Channel (PUCCH) (S108), as a general uplink/downlink signal transmission procedure.

Meanwhile, if several pieces of transmission information are received, for example, if Multiple-Input Multiple-Output (MIMO) technology, multiuser detection technology or multi-code technology is used, it is possible to improve performance using an interference cancellation type receiver.

In an interference cancellation scheme such as a Successive Interference Cancellation (SIC) scheme, first information out of an overall received signal including several pieces of information is demodulated/decoded, information associated with the first information is removed from the overall received signal, a second signal out of the signal in which the first information is removed from the overall received signal is demodulated/decoded, a third signal out of the signal in which the first information and the second information are removed from the first received signal is demodulated/decoded, and the above-described process is performed with respect to a fourth signal and the subsequent signals thereof. By successively removing the demodulated/decoded signals from the received signal, it is possible to improve the performance of the subsequent demodulating/decoding process.

Meanwhile, if a signal is transmitted using a MIMO scheme, the transmitted signal is transmitted in the layer units. Accordingly, error detection of the layer units is required for efficiently implementing the above-described SIC scheme, and in depth research thereinto is required.

DISCLOSURE OF INVENTION

Technical Problem

An object of the present invention devised to solve the problem lies in a method and apparatus for detecting an error in the layer units while minimizing the change of a system such that a Successive Interference Cancellation (SIC) gain is maximized, if a signal is transmitted using a Multiple-Input Multiple-Output (MIMO) scheme.

Technical Solution

The object of the present invention can be achieved by providing a transmission method for segmenting and transmitting a transport block via at least one layer, the transmission method including: segmenting the transport block into code blocks corresponding in number to a multiple of the number of layers to be used for the transmission of the transport block; attaching a Cyclic Redundancy Check (CRC) to the segmented code blocks; and mapping the code blocks to which the CRC has been attached to at least one layer and transmitting the code blocks.

If the number of layers to be used for initial transmission of the transport block and the number of layers to be used for retransmission are different, the multiple of the number of layers to be used for the transmission may be a common multiple of the number of layers to be used for the initial transmission and the number of layers to be used for the retransmission.

If the number of layers to be used for the retransmission of the transport block is less than the number of layers used for the initial transmission, the segmenting of the transport block may include segmenting the transport block into sub transport blocks of the number corresponding to the number of layers to be used for the retransmission of the transport block, and segmenting the sub transport blocks into code blocks corresponding in number to the common multiple of the number of layers used for the initial transmission and the number of layers used for the retransmission, and the code blocks segmented from one of the sub transport blocks may be transmitted via one layer in retransmission.

The segmenting of the transport block may include segmenting the transport block into code blocks having a specific bit number. The segmenting of the transport block may include attaching a dummy bit to at least one of the code blocks having the specific bit number. The length of the transport block may be set in advance such that a code block having a length less than the specific bit number is not generated in the segmenting of the transport block.

Padding of a Medium Access Control (MAC) Protocol Data Unit (PDU) corresponding to the transport block may be used such that a code block having a length less than the specific bit number is not generated in the segmenting of the transport block.

The code blocks to which the CRC is attached may be sequentially mapped to the at least one layer.

The transmitting of the code blocks may include performing scrambling and modulating the code blocks mapped to the at least one layer, and performing precoding with respect to the scrambled and modulated code blocks and transmitting the code blocks.

Each of the segmented code blocks may be mapped to one layer.

In another aspect of the present invention, provided herein is a transmission device for segmenting and transmitting a transport block via at least one layer, the transmission device including: a virtual layer segmentation portion which segments the transport block into code blocks corresponding in number to a multiple of the number of layers to be used for the transmission of the transport block; a first Cyclic Redundancy Check (CRC) attaching portion which attaches a CRC to the segmented code blocks; a layer mapper which maps the code blocks to which the CRC has been attached to at least one layer; and a transmission portion which transmits the code blocks mapped to the at least one layer.

The transmission device may further include a second CRC attaching portion which attaches a CRC to the transport block.

The transmission device may further include a dummy bit attaching portion which attaches a dummy bit to the front or rear of the transport block.

If the number of layers to be used for initial transmission of the transport block and the number of layers to be used for retransmission are different, the multiple of the number of layers to be used for the transmission may be a common multiple of the number of layers to be used for the initial transmission and the number of layers to be used for the retransmission. Each of the segmented code blocks may be mapped to one layer.

Advantageous Effects

According to the embodiments of the present invention, it is possible to maximize a Successive Interference Cancellation (SIC) gain while minimizing the change of a system, by performing error detection in the layer units using the existing code block CRC without modification in the transmission of a signal using a Multiple-Input Multiple-Output (MIMO) antenna scheme.

According to the embodiments of the present invention, since a Hybrid Automatic Repeat Request (HARM) transmission scheme and an SIC scheme are efficiently used in a mobile communication system supporting an Orthogonal Frequency Division Multiplexing (OFDM) scheme such that code blocks are equally mapped to layers even when the number of layers used for transmission is changed, it is possible to maintain an SIC gain and improve decoding performance.

BRIEF DESCRIPTION OF DRAWINGS

The accompanying drawings, which are included to provide a further understanding of the invention, illustrate embodiments of the invention and together with the description serve to explain the principle of the invention.

In the drawings:

FIG. 8 is a view showing a procedure for segmenting and mapping a transport block to layers at a transmission device according to an embodiment of the present invention.

FIG. 9 is a view showing a procedure for segmenting and mapping a transport block to layers at a transmission device according to another embodiment of the present invention.

FIG. 10 is a view showing a state in which code blocks are segmented and mapped to layers, according to another embodiment of the present invention.

BEST MODE FOR CARRYING OUT THE INVENTION

Figure 1:
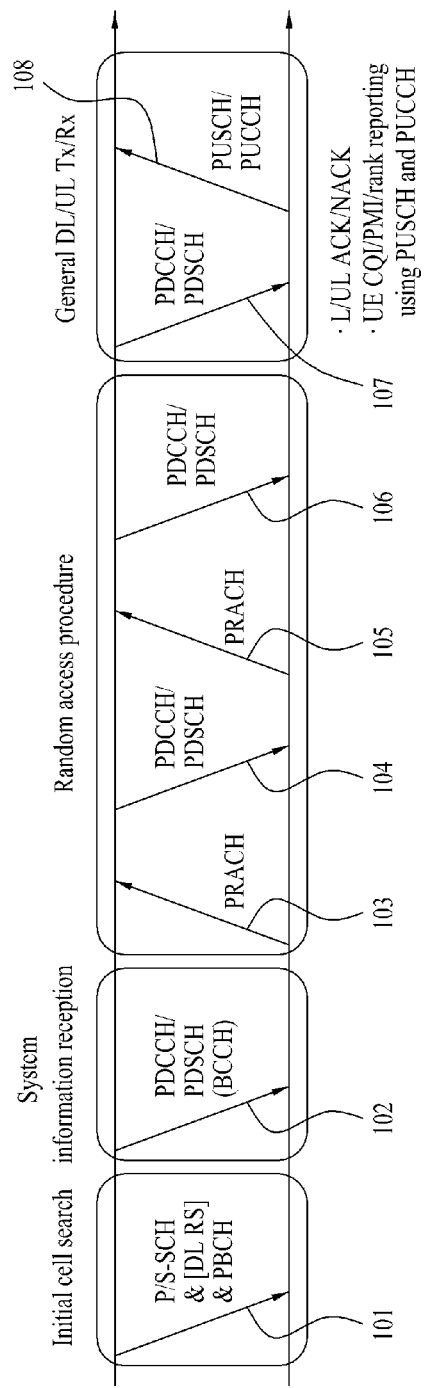
FIG. 1 is a view showing physical channels used for a $3^{rd}$ Generation Partnership Project (3GPP) Long Term Evolution (LTE) system, which is an example of a mobile communication system, and a general signal transmission method using the same.

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment through which the present invention can be carried out. Hereinafter, the detailed description includes detailed matters to provide full understanding of the present invention. However, it will be apparent to those skilled in the art that the present invention can be carried out without the detailed matters.

To prevent ambiguity in the concept of the present invention, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

If a transport block is transmitted by a Multiple-Input Multiple-Output (MIMO) scheme as described above, the transport block is transmitted in the layer units. Accordingly, error detection of the layer units is required for efficiently implementing a Successive Interference Cancellation (SIC) scheme. In order to implement the error detection of the layer units while minimizing system changes, a procedure for transmitting a transport block in a state of being mapped to layers on a system and an error detection means used at this time need to be considered. In a physical layer of a general communication system, a forward error detection code is used such that a receiver judges whether an error occurs in a transport block transmitted via transport channels.

In detail, in order to allow a receiver to correct an error which occurs in a channel, a transmitter transmits information after performing coding using a forward error correction code. The receiver demodulates a received signal, performs a decoding process with respect to the forward error correction code, and restores transmitted information. The error included in the received signal, which occurs in the channel, is corrected by the decoding process. Since each of all forward error correction codes has a maximally correctable limit to channel error correction, the receiver cannot decode information without error if the received signal has an error exceeding the limit of the forward error correction code. Accordingly, a criterion for allowing the receiver to determine whether or not an error is present in decoded information is necessary, and a special coding process is necessary for error detection, independent of an error correction coding process.

A Cyclic Redundancy Check (CRC) code is generally used as such an error detection code. The CRC is one coding method used for error detection, but not for error correction. For example, if a transport block has k bits, m bits are added next to the transport block, and an n-bit codeword is coded and transmitted. A receiver may receive n bits, divide the n bits by a predetermined number, and detect whether or not an error which is frequently generated in a data transmission process is present depending on whether or not a remainder is generated.

Figure 2:
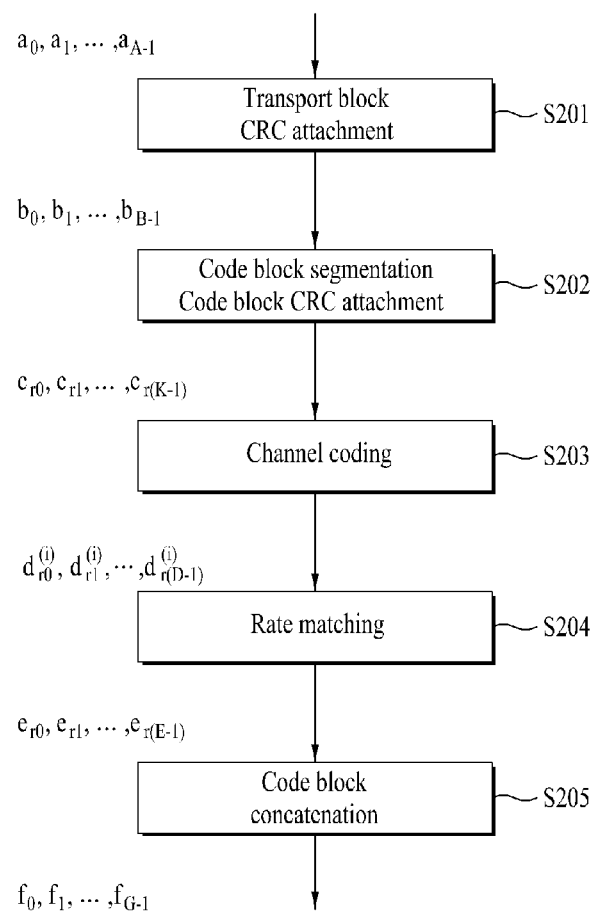
FIG. 2 is a view explaining a procedure for concatenating code blocks of data which will be transmitted in downlink.

FIG. 2 is a view explaining a procedure for performing channel coding of a transport block and attaching a CRC.

As shown in FIG. 2, a Transport Block (TB) CRC is attached to a TB of data to be transmitted in downlink, as an example of an error detection means (S201). Thereafter, a TB having a length of at least a specific bit number may be segmented into a plurality of Code Blocks (CBs), and a CB CRC may be attached to the CBs, as another example of the error detection means (S202).

In a 3$^{rd}$ Generation Partnership Project (3GPP) Long Term Evolution (LTE) system, the specific bit number may be 6144 bits corresponding to the size of an interleaver during channel coding, and one TB which does not exceed 6144 bits is mapped to one CB without modification. At this time, one TB which is not segmented into CBs may correspond to one codeword. At this time, the procedure may progress to step S203 while omitting the step of attaching an additional CB CRC to one TB (CB) of FIG. 2.

Meanwhile, if the length of one TB exceeds the specific bit number, one TB may be segmented into a plurality of CBs. At this time, each of the segmented CBs may correspond to one codeword. With respect to the plurality of codewords, the above-described channel coding for error correction is performed (S203).

In addition, the channel-coded CB(s) are subjected to rate matching (S204) and the CBs are concatenated (S205).

Next, how codeword(s) including the error correction unit through the above-described procedure are mapped to layer(s), which is the transmission dimension of an individual data stream, will be described.

Figure 3:
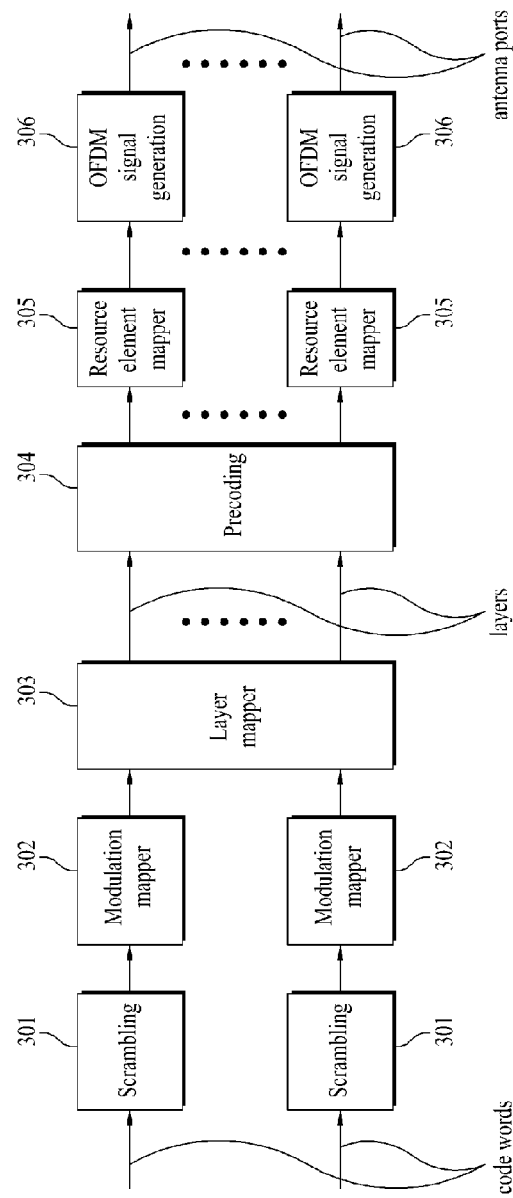
FIG. 3 is a view explaining a signal processing procedure in which a base station (eNB) transmits a downlink signal.

FIG. 3 is a view explaining a procedure for, at a user equipment (UE), transmitting one or more codewords using a MIMO scheme.

One or more codewords which are subjected to the coding procedure shown in FIG. 2 may be scrambled using a UE-specific scrambling signal by scrambling modules 301 of the UE. The scrambled codeword signals are input to modulation mappers 302 so as to be modulated into complex symbols by Binary Phase Shift Keying (BPSK), Quadrature Phase Shift Keying (QPSK), 16-Quadrature amplitude modulation (QAM) or 64-QAM scheme according to the kind of the transmitted signal and/or the channel state. Thereafter, the modulated complex symbols are mapped to one or more layers by a layer mapper 303.

If a signal is transmitted using a single antenna, one codeword is mapped to one layer and is transmitted. However, if a signal is transmitted using multiple antennas, the codeword is mapped and transmitted as shown in Table 1 and Table 2 according to transmission schemes.

TABLE 1

| Number of layers | Number of code words | Codeword-to-layer mapping $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 2 | $x^{(0)}(i) = d^{(0)}(i)$ $x^{(1)}(i) = d^{(1)}(i)$ | $M_{symb}^{layer} = M_{symb}^{(0)} = M_{symb}^{(1)}$ |
| 2 | 1 | $x^{(0)}(i) = d^{(0)}(2i)$ $x^{(1)}(i) = d^{(0)}(2i + 1)$ | $M_{symb}^{layer} = M_{symb}^{(0)}/2$ |
| 3 | 2 | $x^{(0)}(i) = d^{(0)}(i)$ $x^{(1)}(i) = d^{(1)}(2i)$ $x^{(2)}(i) = d^{(1)}(2i + 1)$ | $M_{symb}^{layer} = M_{symb}^{(0)} = M_{symb}^{(1)}/2$ |
| 4 | 2 | $x^{(0)}(i) = d^{(0)}(2i)$ $x^{(1)}(i) = d^{(0)}(2i + 1)$ $x^{(2)}(i) = d^{(1)}(2i)$ $x^{(3)}(i) = d^{(1)}(2i + 1)$ | $M_{symb}^{layer} = M_{symb}^{(0)}/2 = M_{symb}^{(1)}/2$ |

TABLE 2

| Number of layers | Number of code words | Codeword-to-layer mapping $i = 0, 1, \ldots, M_{symb}^{layer}/2$ | |
|---|---|---|---|
| 2 | 1 | $x^{(0)}(i) = d^{(0)}(2i)$ $x^{(1)}(i) = d^{(0)}(2i + 1)$ | $M_{symb}^{layer} = M_{symb}^{(0)}/2$ |
| 4 | 1 | $x^{(0)}(i) = d^{(0)}(4i)$ $x^{(1)}(i) = d^{(0)}(4i + 1)$ $x^{(2)}(i) = d^{(0)}(4i + 2)$ $x^{(3)}(i) = d^{(0)}(4i + 3)$ | |

$$M_{symb}^{layer} = \begin{cases} M_{symb}^{(0)}/4, & \text{if } M_{symb}^{(0)} \bmod 4 = 0 \\ (M_{symb}^{(0)} + 2)/4, & \text{if } M_{symb}^{(0)} \bmod 4 \neq 0 \end{cases}$$

If $M_{symb}^{(0)} \bmod 4 \neq 0$ two null symbols shall be appended to $d^{(0)}(M_{symb}^{(0)} - 1)$ Table 1 shows an example in which a signal is transmitted using a spatial multiplexing scheme and Table 2 shows an example in which a signal is transmitted using a transmit diversity scheme. In addition, in Table 1 and Table 2, $x^{(a)}(i)$ denotes an $i^{th}$ symbol of a layer having an index a and $d^{(a)}(i)$ denotes an is symbol of a codeword having an index a. The mapping relationship between the number of codewords and the number of layers used for transmission can be seen from "number of codewords" and "number of layers" of Table 1 and Table 2, and how the symbols of each codeword are mapped to layers can be seen from "Codeword-to-Layer mapping"

As can be seen from Table 1 and Table 2, one codeword may be transmitted in a state of being mapped to one layer in the symbol units or one codeword may be dispersedly Mapped to a maximum of four layers as in a second case of Table 2. If one codeword is dispersedly mapped to a plurality of layers, symbols configuring each codeword may be transmitted in a state of being sequentially mapped to the layers.

The signals mapped to the layers may be multiplied by a predetermined precoding matrix selected according to the channel state by a precoding module 304 so as to be allocated to transmission antennas. The transmitted signals of the antennas may be mapped to time-frequency resource elements to be used for transmission by resource element mappers 305 and may then be transmitted via OFDM signal generators 306 and the antennas. Although the downlink transmission of the 3GPP LTE system, that is, the OFDM signal generators 306, is shown in the example of FIG. 3, the present invention is not limited thereto and may be applied to the transmission of an uplink signal using a Single-Carrier Frequency Division Multiple Access (SC-FDMA) scheme.

Meanwhile, a problem which may be generated if the signal is transmitted in a state of being mapped to the layers as described with reference to FIG. 3 and, more particularly, if one codeword is dispersedly mapped to a plurality of layers will be described.

Figure 4:
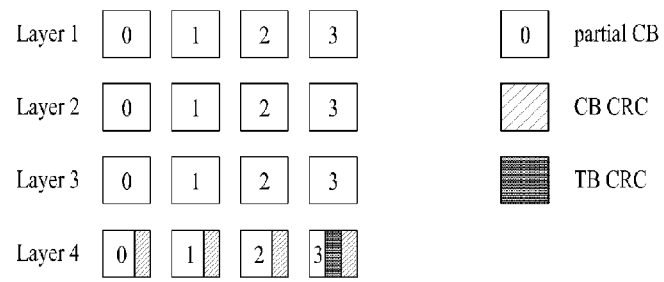
FIG. 4 is a view showing a state in which a transport block is generally segmented and arranged during data transmission.

FIG. 4 is a view showing a case where one codeword is dispersedly mapped to four layers.

FIG. 4 shows the case where one codeword is dispersedly mapped to four layers as in the second case of Table 2. In FIG. 4, it is assumed that Partial CB denotes some of CBs having an index corresponding to a numeral in a box, and is a unit including one or more complex symbols corresponding to one CB in association with Table 1 and Table 2.

Referring to FIG. 4, when CBs 0, 1, 2 and 3 and four transport layers are present, symbols configuring the CBs are dispersedly mapped to four layers. In addition, in the example of FIG. 4, it is assumed that one CB is composed of four partial CBs. In this case, since a CB is transmitted in a state of being segmented so as to be dispersed to layers, CRC error detection of the received layers cannot be performed using a CB CRC attached to one CB. FIG. 4 shows an example in which both a TB CRC and a CB CRC are mapped only to a layer 4.

In a Successive Interference Cancellation (SIC) scheme, first information out of an overall received signal including several pieces of information is demodulated/decoded, information associated with the first information is removed from the overall received signal, a second signal out of the signal in which the first information is removed from the overall received signal is demodulated/decoded, a third signal out of the signal in which the first information and the second information are removed from the first received signal is demodulated/decoded, and the above-described process is performed with respect to a fourth signal and the subsequent signals thereof. By successively removing the demodulated/decoded signals from the received signal, it is possible to improve the performance of the subsequent demodulating/decoding process.

In order to use an interference cancellation scheme such as an SIC scheme, that is, in order to apply an SIC scheme for determining whether an error occurs in a demodulated/decoded signal and selectively cancelling interference, a CRC code functioning as an error detection code should be included in the layer units as the interference cancellation units. As a method for including a CRC in the layer units, in one embodiment of the present invention, a method for transmitting the CBs to which the CB CRC has been attached only through one layer without being dispersedly mapped to a plurality of layers or a method for simultaneously transmitting symbols located at the same position of a plurality of CBs through a plurality of layers while changing a layer index is suggested. At this time, if one CB is transmitted through one layer, a scheme for mapping the CB to the layer is not specially limited. In addition, as described above, in order to transmit a codeword through one layer according to a predetermined mapping rule, it is preferable that the number of codewords is set to a multiple of the number of layers used for transmission.

If a Hybrid Automatic Repeat Request (HARQ) transmission scheme is supported in the SIC scheme, the number of layers used for transmission should be considered. This is because, if symbols configuring one CB are dispersedly mapped to a plurality of layers in order to equally allocate data per layer as shown in FIG. 4, an SIC gain is decreased as described above when the number of layers is changed at the time of retransmission. Accordingly, in order to apply the SIC scheme even when the number of layers is changed at the time of initial transmission and retransmission, one CB should be allocated to one layer and data should be concatenated at the time of retransmission.

Figure 5:
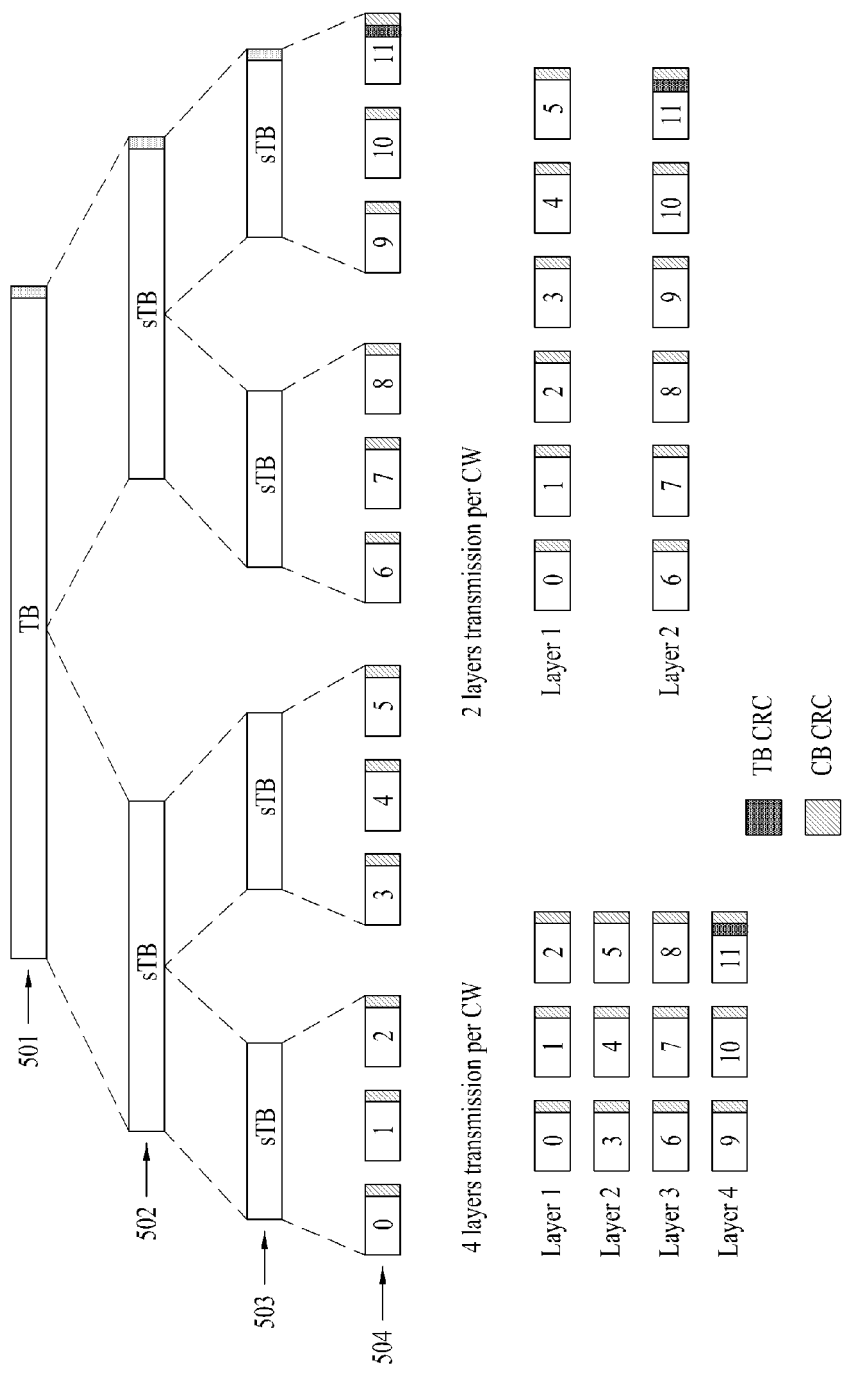
FIG. 5 is a view showing a state in which a transport block is segmented and mapped to layers, according to an embodiment of the present invention.

FIG. 5 is a view showing a state in which a TB is segmented and mapped to layers, according to an embodiment of the present invention.

In a communication system using a HARQ transmission scheme, a TB may be segmented into CBs. Referring to FIG. 5, the TB having a length of a specific bit number or more, which is transmitted from a Media Access Control (MAC) layer to a Physical (PHY) layer, may be segmented into a multiple of the number of layers to be used for transmission. A halving scheme may be continuously performed as a segmentation scheme. If it is assumed that four layers are supported in initial transmission and two layers are supported in retransmission as shown in FIG. 5, the TB 501 may be segmented into CBs corresponding in number to a multiple of 4 which is a least common multiple of the numbers of layers supported in the initial transmission and retransmission. That is, the TB 501 is halved into two first sub TBs (sTB) 502, the first sub TBs 502 are equally halved into a total of four second sub TBs 503. Thereafter, if each of the segmented second sub TBs 503 is segmented into three CBs, a total of 12 CBs 504 from 0 to 11 may be generated, which is the multiple of 4 which is the least common multiple of the numbers of layers supported in the initial transmission and the retransmission.

When the CBs 504 to which the CRC has been attached are mapped to layers, each of the CBs may be transmitted using one layer and each of the layers may receive a plurality of CBs. Thus, the layers may be allocated according to the CBs.

Accordingly, if four layers are used for initial transmission, the CBs may be equally mapped in a manner of sequentially mapping three CBs from 0 to 2 to a first layer, and sequentially mapping three CBs from 3 to 5 to a second layer. In addition, if two layers are used for retransmission, the CBs may be equally mapped in a manner of sequentially mapping six CBs from 0 to 5 to a first layer, and sequentially mapping six CBs from 6 to 11 to a second layer.

In contrast, when the CBs are mapped to the layers used for initial transmission, the CBs may be sequentially mapped to the layers in one-to-one correspondence in a manner of mapping a CB 0 to a first layer, mapping a CB 1 to a second layer, mapping a CB 2 to a third layer, and mapping a CB 3 to a fourth layer. The same is true even when the CBs are mapped to the layers used for retransmission. The CB CRC is attached to the CBs and all the layers used for transmission include the CRC.

If the size of the TB 501 does not exceed the specific bit number, the TB is equally treated with the codeword and includes a TB CRC. The specific bit number functioning as the segmentation criterion is 6144 bits. If the size of the TB exceeds the specific bit number, the TB is segmented into several CBs, and is successively segmented into the sub TB units as the intermediate step of the segmentation as shown in FIG. 5. Accordingly, some of the segmented sub TBs 502 and 503 include the TB CRC. The CB CRC is attached to the CBs segmented from the sub TB. Thus, one CB, that is, an eleventh CB, includes not only the TB CRC but also the CB CRC.

Alternatively, if each of the second sub TBs 503 is segmented into two CBs, a total of 8 CBs corresponding to a multiple of 4, which is a least common multiple of the numbers of layers supported in initial transmission and retransmission may be generated. The CBs may be sequentially mapped to four layers supported in the initial transmission two by two and the CBs may be sequentially mapped to two layers supported in the retransmission four by four.

Meanwhile, if it is difficult to equally segment the TB to which the TB CRC has been attached into the CBs, various methods may be used.

A first method for attaching a dummy bit before attaching a TB CRC to a TB and performing equal segmentation or attaching a dummy bit after attaching a TB CRC to a TB or a second method for equally segmenting a TB if possible and attaching a CB CRC after attaching a dummy bit to the front or rear of a predetermined CB when CBs are configured or attaching a dummy bit to the front or rear of the CBs to which the CB CRC has been attached after attaching the CB CRC to CBs may be used.

In the method for segmenting one TB into a plurality of CBs, a method for directly segmenting the TB into CBs corresponding in number to the number of layers supported in the transmission may be used instead of the method of successively halving the TB, and may be physically or conceptually implemented.

According to one embodiment of the present invention, since the information change and the length of the CBs 504 to which the CRC has been attached are maintained on the layer even in the initial transmission or the retransmission with respect to one TB 501, restoration may be performed even when the number of layers used for initial transmission is changed during retransmission.

Figure 6:
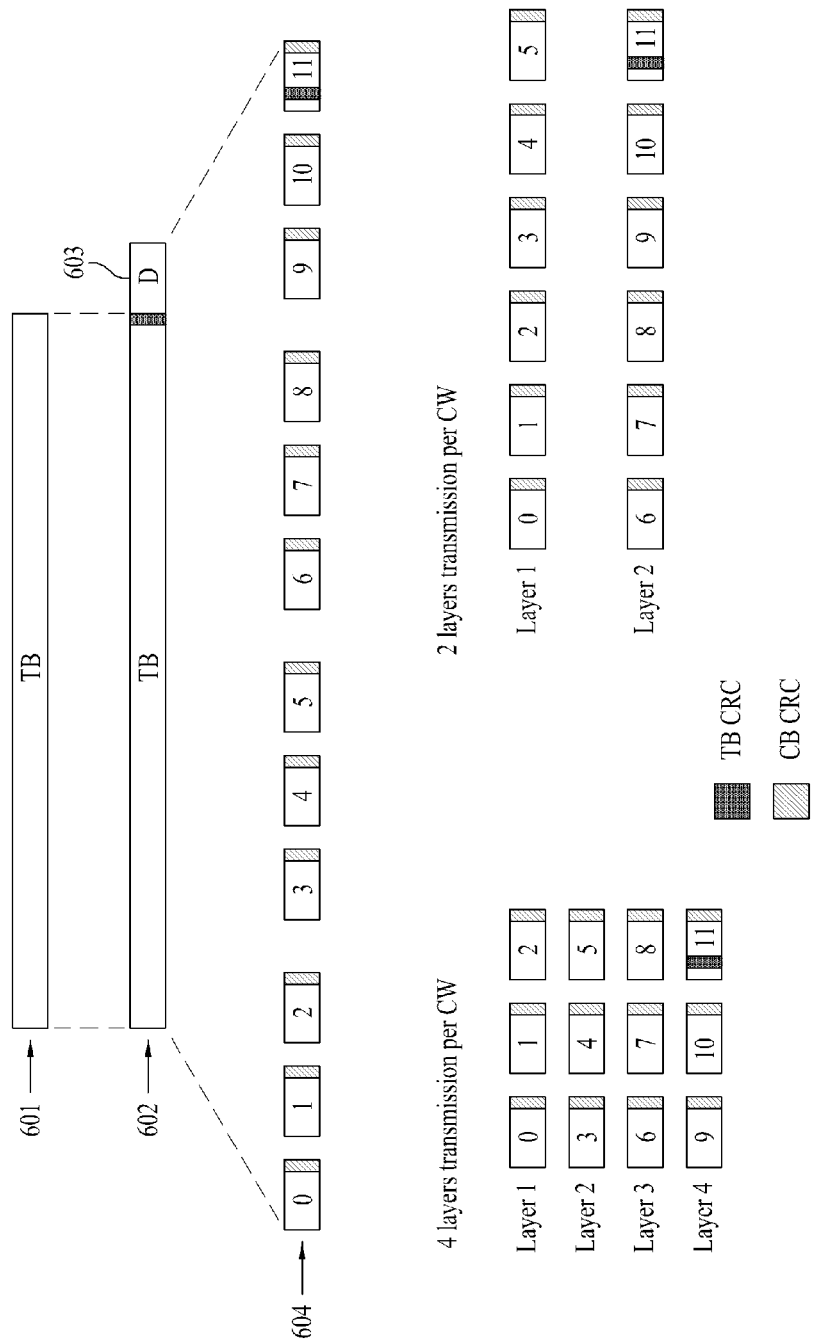
FIG. 6 is a view showing a state in which a transport block is segmented and mapped to layers, according to another embodiment of the present invention.

FIG. 6 is a view showing a state in which a TB is segmented and mapped to layers, according to another embodiment of the present invention.

In a HARQ transmission scheme, the number of CBs may be set to a multiple of the number of layers used for transmission when a TB transmitted from an MAC layer to a PHY layer is segmented into CBs. Referring to FIG. 6, if four layers are supported in initial transmission and two layers are supported in retransmission, a TB CRC may be attached to one TB 601 and segmented into a total of 12 CBs 604 corresponding to a multiple of a least common multiple of the number of layers used for the initial transmission and the number of layers used for the retransmission.

At this time, if the size of the TB 601 does not exceed a specific bit number and thus the TB is not segmented, the TB 601 becomes a CB. In this case, since the TB CRC is attached to the TB, a CB CRC is not attached to the TB. If the size of the TB exceeds the specific bit number and thus the TB is segmented into two or more CBs, a CB CRC is attached to the CBs.

At this time, if it is difficult to equally segment the TB 602 to which the TB CRC has been attached into the CBs 604 by the multiple of the least common multiple of the number of layers used for the initial transmission and the number of layers used for the retransmission, a dummy bit 603 may be attached to the TB 602. Alternatively, the TB may be equally segmented after a dummy bit is attached to the TB 601 before attaching the TB CRC and then the TB CRC is attached.

As another method, as described above, a method for equally segmenting a TB if possible and attaching a CB CRC after attaching a dummy bit to the front or rear of a predetermined CB when CBs are configured or attaching a dummy bit to the front or rear of the CBs to which the CB CRC has been attached after attaching the CB CRC to CBs may be used. This method may be physically or conceptually implemented.

Figure 7:
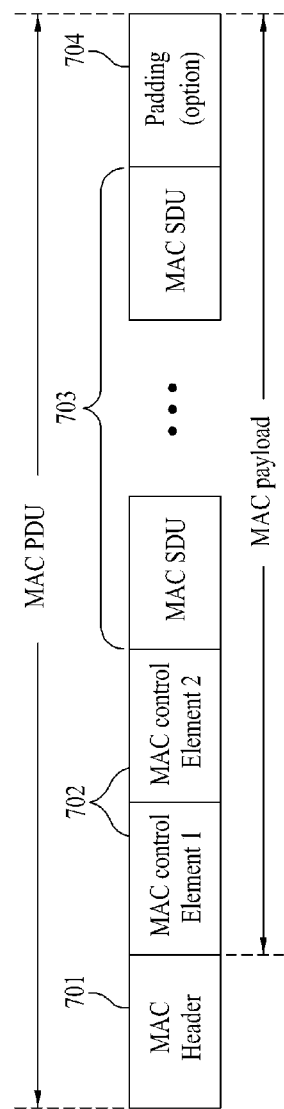
FIG. 7 is a view showing a method for generating a transport block using padding in a Media Access Control (MAC) layer according to an embodiment of the present invention.

In the mapping of the CBs, to which CB CRC has been attached, to the layers, similar to FIG. 7, since each of the CBs may be transmitted using one layer and each of the layers may receive a plurality of CBs, the layers may be allocated according to the CBs. That is, if four layers are used for the initial transmission, the CBs may be sequentially and equally mapped to one layer in a manner of mapping three CBs from 0 to 2 to a first layer and mapping three CBs from 3 to 5 to a second layer. If two layers are used for the retransmission, the CBs may be sequentially and equally mapped in a manner of mapping six CBs from 0 to 5 to a first layer and mapping six CBs from 6 to 11 to a second layer.

In contrast, when the CBs are mapped to the layers used for the initial transmission, the CBs may be sequentially mapped to the layers in one-to-one correspondence in a manner of mapping a CB 0 to a first layer, mapping a CB 1 to a second layer, mapping a CB 2 to a third layer, and mapping a CB 3 to a fourth layer. The same is true even when the CBs are mapped to the layers used for the retransmission.

Similarly, a total of 8 CBs corresponding to the multiple of 4, which is the least common multiple of the numbers of layers supported in the initial transmission and the retransmission may be generated. The CBs may be sequentially mapped to four layers supported in the initial transmission two by two and the CBs may be sequentially mapped to two layers supported in the retransmission four by four.

Even in this case, since the information change and the length of the CBs 604 to which the CRC is attached are maintained on the four layers used for the initial transmission or retransmission or two layers used for the initial transmission or retransmission with respect to one TB 601, restoration may be performed even when the number of layers used for initial transmission is changed in retransmission.

Up to now, in the method for transmitting the upper layer signal received by the physical layer of the mobile communication device, the method for segmenting one TB into the CBs and the method for attaching the dummy bit if the TB is not equally segmented were described.

As another method for equally segmenting a TB, there is a method for adjusting the length of the TB. A TB having a length corresponding to a value obtained by multiplying a specific bit number by a multiple of the number of layers used for the transmission of the TB as expressed by Equation 1 may be received.

$$TB = Z \times nR \qquad \text{[Math Figure 1]}$$

where, Z denotes the specific bit number and R denotes the number of layers used for transmission. According to Equation 1, when the TB having the length corresponding to $Z \times nR$ is segmented into CBs corresponding in number to a multiple of the number of layers, the TB may be equally segmented.

According to the embodiment of the present invention, an SIC scheme may be used and decoding performance can be improved. At this time, in order to support a method for obtaining an SIC gain even when the number of layers supported in the retransmission is changed, a TB may be segmented into CBs corresponding in number to a least common multiple or more of the number of layers supported in transmission in an LTE system. That is, even when a TB composed of one CB is input to a PHY layer, the TB may be segmented into a plurality of CBs having a length smaller than that of one CB based on a least common multiple of the number of layers supported in transmission. If the number of layers used for retransmission of the TB is changed in order to support HARQ transmission, four layers are used for initial transmission and two or four layers are used for retransmission in consideration of the configuration complexity of the CBs.

Next, a method for preventing a dummy bit from being generated in a PHY layer when a TB is segmented if CBs supporting HARQ transmission are configured will be described.

FIG. 7 is a view showing a method for generating a TB using padding in a MAC layer according to an embodiment of the present invention.

A basic MAC payload includes a MAC header 701, at least one piece of MAC control information 702 as resource information and at least one MAC Service Data Unit (SDU) 704. Since a MAC Protocol Data Unit (PDU) is one TB in view of a PHY layer, padding 704 may be selectively enlarged.

In detail, as shown in FIG. 5, in order to prevent a dummy bit from being generated in the method for equally segmenting the TB to which the CRC has been attached by the number corresponding to the least common multiple of the numbers of layers used for the initial transmission and retransmission, the length of the MAC PDU may be adjusted using iteration of single-byte padding or two-byte padding or additional padding. In addition, as shown in FIG. 6, in order to fix the number of CBs to the multiple of the least common multiple of the numbers of layers used for the initial transmission and retransmission when the TB to which the CRC has been attached is segmented into the CBs, the length of the MAC PDU may be adjusted using iteration of single-byte padding or two-byte padding or additional padding such that a dummy bit is not generated.

Alternatively, the size of the TB is adjusted such that the dummy bit is not generated in the PHY layer when the TB is segmented.

A scheduler may adjust the size of the TB such that the dummy bit is not generated in the method for equally segmenting the TB to which the CRC has been attached by the number of the least common multiple of the numbers of layers used for the initial transmission and retransmission as shown in FIG. 5. In addition, as shown in FIG. 6, in order to fix the number of CBs to the multiple of the least common multiple of the number of layers used for initial transmission and retransmission when the TB to which the CRC has been attached is segmented into CBs, the size of the TB may be set such that a dummy bit is not generated.

As another method, the dummy bit and the padding method of FIGS. 5 to 7 may be simultaneously used.

In the present invention, rank limit or layer limit should be considered in order to simplify the method for configuring the CBs and support HARQ transmission. That is, if it is assumed that a maximum number of layers which can be used for transmission of one TB is 4, the number of layers may be specified such that four layers are used for initial transmission and four or two layers are used for retransmission. The number of layers may be limited by various combinations such as three layers and two layers.

Next, a transmission device for segmenting a TB, performing layer mapping and transmitting the TB will be described.

FIG. 8 is a view showing a procedure for segmenting and mapping a TP to layers at a transmission device according to an embodiment of the present invention.

The transmission device according to the embodiment of the present invention may include a TB CRC attachment portion for attaching a CRC to a TB in order to segment the TB having a length of a specific bit number or more and transmitting the TB via one or more layers, a virtual layer segmentation portion for segmenting the TB to which the CRC has been attached into CBs of the number of a multiple of the number of layers used for transmission of the TB, a CB CRC attachment portion for attaching a CRC to each of the segmented CBs, a layer mapper for mapping each of the CBs to which the CRC has been attached to one layer, a scrambler and modulation mapper for scrambling and modulating the CBs mapped to the layers, and a precoder and transmission antenna for performing precoding with respect to the scrambled and modulated signals according to the CBs.

The process of transmitting a CB 0 or a CB 1 using the transmission device according to the present invention will now be described with reference to FIG. 8. First, the TB CRC is attached to the TB input from the MAC layer by the TB CRC attachment portion (S801). The TB CRC is used to detect an error in the TB decoded by a receiver and may consist of 24 bits. The virtual layer segmentation portion may segment the TB to which the CRC has been attached into blocks of a least common multiple of the number of layers which may be used for transmission in consideration of HARQ transmission (S802).

The segmented blocks of the least common multiple of the number of layers which may be used in consideration of HARQ transmission may be considered virtual layers. Based on the blocks allocated to the virtual layers, the CB CRC segmentation portion performs CB segmentation and attaches the CB CRC to the segmented CBs (S803), a channel coding portion may code the CBs (S804), and a rate matching portion may perform rate matching (S805). The CBs generated in the virtual layer paths are input to the layer mapper so as to be actual layers (S806). At this time, the CBs input to the layer mapper may be selectively concatenated to blocks generated in the virtual layer paths according to the layers by a code block concatenation portion or may be concatenated in the layer mapper according to the layers. Since one layer is allocated according to the blocks generated in the virtual layer paths and each of the layers can receive the blocks generated in various virtual layer paths, the blocks generated in each of the virtual layer paths may be sequentially allocated according to the layers or each of the blocks generated in one virtual layer path may be sequentially allocated to each layer.

The scrambler and modulation mapper processes the CBs in the layer units and uses the same scheme as an LTE system up to a final step (S807 and S808). The portions processed in the virtual layer units and the layer units may be physically segmented and may temporally share one hardware resource. The CBs subjected to the modulating step S808 are input to the precoder so as to be precoded (S809) and are mapped to resources by a resource element mapper (S810), and signals to be transmitted are generated by an OFDM signal generator (S811) and are transmitted via antennas.

Next, FIG. 9 is a view showing a procedure for segmenting and mapping a TB to layers at a transmission device according to another embodiment of the present invention.

The transmission device according to the present invention may further include a dummy bit attachment portion for attaching a dummy bit to the front or rear of the TB to which the CRC has been attached, in addition to the components of the above-described transmission device.

The process of transmitting a CB 0 or a CB 1 in the transmission device according to the present invention will now be described with reference to FIG. 9. First, the TB CRC is attached to the TB input from the MAC layer by the TB CRC attachment portion (S901). The TB CRC is used to detect an error in the TB decoded by a receiver and may consist of 24 bits. In the dummy bit attachment portion, the number of CBs segmented when the TB to which the CRC has been attached is segmented into CBs is set based on the least common multiple of the numbers of layers used for the initial transmission and retransmission when the TB to which the CRC has been attached is segmented. At this time, if the TB cannot be equally segmented based on the least common multiple, the dummy bit may be attached to the front or rear of the TB to which the CRC has been attached (S902). In the dummy bit attachment portion, the size of the TB may be set to a size capable of equally segmenting the TB to which the CRC has been attached when the CBs are configured, using another method. The CB CRC segmentation portion performs CB segmentation and attaches the CB CRC to the segmented CBs (S903), a channel coding portion may code the CBs to which the CB CRC has been attached (S904), and a rate matching portion may perform rate matching (S905). A layer mapper allocates the input CBs actual layers (S906). At this time, the CBs input to the layer mapper may be selectively concatenated to input blocks according to the layers by a code block concatenation portion or may be concatenated in the layer mapper according to the layers. Since one layer is allocated according to the input CBs and each of the layers can receive a plurality of CBs, the input CBs may be sequentially allocated according to the layers or one CB may be sequentially allocated to each layer.

Next, the scrambler and modulation mapper processes the CBs in the layer units and uses the same scheme as an LTE system up to a final step (S907 and S908). The portions processed in the layer units may be physically segmented and may temporally share one hardware resource. The CBs subjected to the modulating step S908 are input to the precoder so as to be precoded (S909) and are mapped to resources by a resource element mapper (S910), and signals to be transmitted are generated by an OFDM signal generator (S911) and are transmitted via antennas.

Although the method for mapping the symbols of the same CB so as to be transmitted via the same layer is suggested as the method for including the CRC in the layers, a method for transmitting the symbols of different CBs via a plurality of layers while changing the layer positions thereof may be employed as another embodiment of the present invention.

FIG. 10 is a view showing a state in which CBs are segmented and mapped to layers, according to another embodiment of the present invention.

Referring to FIG. 10, when a plurality of CBs is mapped to the same number of layers, the symbols located at the same position in the plurality of CBs may be mapped while changing the layer indexes thereof, in order to coincide with a signal ratio between CBs. Accordingly, if two CBs 0 and 1 are transmitted via two layers, a mapping scheme for simultaneously and respectively mapping the respective first symbols of the CBs to the respective layers, mapping the respective second symbols of the CBs to the respective other layers, and mapping the respective third symbols of the CBs to the layers having the same layer indexes as the first symbols may be used.

As a result, this method is equal to a method for sequentially mapping one CB to the layer, and each layer includes the CB CRC. Thus, an SIC gain can be obtained. By such a method, a base station (eNB) transmits data to a UE in downlink. At this time, the eNB may allocate a Modulation and Coding Scheme (MCS), a Redundancy Version (RV), a code rate, a New Data Indicator (NDI), a HARQ ID, the number of layers used per TB (or the number of ranks used for transmission), or data allocation information to a PDCCH, allocate coded data to a PDSCH, and transmit the data to the UE. When the UE receives the PDCCH, the UE decodes the PDCCH, decodes the PDSCH using that information, and stores the data in a soft buffer based on the data after the setting and encoding used by the transmitter. If the result of decoding the PDSCH is abnormal, the UE transmits a NACK message indicating that an error has occurred in the transmission to the eNB via the PUCCH or the PUSCH, and transmits an ACK message if the decoded result is normal.

When the eNB receives the NACK message from the UE, the eNB sets the MCS, the RV, the code rate, and the number of layers used per TB in consideration of a channel state. In addition, the same TB may be input to the PHY layer again so as to be coded or CBs to be input to a layer mapper may be regenerated using a buffer for storing the coded result in the initial transmission. The layer mapper may perform reallocation in a manner of sequentially mapping CBs to layers in consideration of the changed number of layers or alternately mapping a series of CBs to layers, perform scrambling, modulation mapping and precoding in the layer units, and perform retransmission.

In contrast, when the UE receives the PUCCH, the UE determines whether or not retransmission is performed using the NDI, the RV, the HARQ ID or the like, concatenates the data, which is previously transmitted and stored in the soft buffer, and the retransmitted data, and decodes the PDSCH. If the result of decoding the PDSCH is abnormal, the UE performs the operation for transmitting the ACK/NACK message and requests retransmission or completes the transmission of the TB.

The above-mentioned embodiments of the present invention are disclosed on the basis of a data communication relationship between an eNB and a UE. In this case, the eNB is used as a terminal node of a network via which the eNB can directly communicate with the UE. Specific operations to be conducted by the eNB in the present invention may also be conducted by an upper node of the eNB as necessary.

In other words, it will be obvious to those skilled in the art that various operations for enabling the eNB to communicate with the UE in a network composed of several network nodes including the eNB will be conducted by the eNB or other network nodes other than the eNB. The term eNB may be replaced with a fixed station, NodeB, or an access point as necessary. The term UE corresponds to a Mobile Station (MS), and the term MS may also be replaced with Subscriber Station (SS), mobile subscriber station (MSS), or mobile terminal as necessary.

Meanwhile, as the UE of the present invention, a Personal Digital Assistant (PDA), a cellular phone, a Personal Communication Service (PCS) phone, a Global System for Mobile (GSM) phone, a Wideband CDMA (WCDMA) phone, or a Mobile Broadband System (MBS) phone may be used.

The following embodiments of the present invention can be implemented by a variety of means, for example, hardware, firmware, software, or a combination thereof.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known means.

MODE FOR THE INVENTION

Various embodiments have been described in the best mode for carrying out the invention.

It will be apparent to those skilled in the art that various modifications and variations can be made in the present invention without departing from the spirit or scope of the invention. Accordingly, the above detailed description is intended to be illustrative rather than restrictive. The invention is defined by the appended claims, and all changes to the invention that fall within the meaning and range of equivalency of the claims are to be embraced within their scope. It will be apparent that embodiments may be configured by combining claims without an explicit relationship therebetween or new claims may be added by amendment after application.

INDUSTRIAL APPLICABILITY

The exemplary embodiments of the present invention are applicable to various wireless access systems including a 3GPP system, a 3GPP2 system, and/or an Institute of Electrical and Electronics Engineers (IEEE) 802.xx system. Besides these wireless access systems, the exemplary embodiments of the present invention are applicable to all technical fields in which the wireless access systems find their applications.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents. Also, it is obvious to those skilled in the art that claims that are not explicitly cited in each other in the appended claims may be presented in combination as an exemplary embodiment of the present invention or included as a new claim by a subsequent amendment after the application is filed.

The invention claimed is:

1. A method for a transmission device transmitting a transport block, the method comprising:
  attaching a first cyclic redundancy check (CRC) to the transport block;
  segmenting the first CRC-attached transport block into a specific number of code blocks;
  attaching a second CRC to each of the specific number of code blocks;
  mapping the second CRC-attached code blocks to first number of layers for initial transmission of the transport block and mapping the second CRC-attached code blocks to a second number of layers for retransmission of the transport block; and
  transmitting the layer-mapped code blocks to a reception device,
  wherein:
  the specific number is a multiple of a least common multiple of the first number and the second number;
  the first number and the second number are different from each other;
  the second CRC-attached code blocks are mapped to the first number of layers such that each of the first number of layers includes a first number of second CRC-attached code blocks; and
  the second CRC-attached code blocks are mapped to the second number of layers such that each of the second number of layers includes a second number of second CRC-attached code blocks.

2. The method according to claim 1, wherein segmenting the first CRC-attached transport block comprises:
  segmenting the first CRC-attached transport block into a first specific number of sub transport blocks, wherein the first specific number corresponds to the least common multiple of the first number and the second number; and
  segmenting each of the first specific number of sub transport blocks into a second specific number of code blocks, wherein a product of the first specific number and the second specific number corresponds to the multiple of the least common multiple of the first number and the second number, and
  wherein the second specific number of code blocks segmented from one of the first specific number of sub transport blocks are transmitted via one layer during the retransmission of the transport block when the second number is less than the first number.

3. The method according to claim 1, wherein segmenting the first CRC-attached transport block comprises segmenting the first CRC-attached transport block into code blocks having a specific bit length.

4. The method according to claim 3, wherein segmenting the first CRC-attached transport block comprises attaching a dummy bit to at least one of the specific number of code blocks such that each of the specific number of code blocks has the specific bit length.

5. The method according to claim 3, wherein a length of the transport block is set in advance such that no code block having a length less than the specific bit length is generated by segmenting the first CRC-attached transport block.

6. The method according to claim 3, further comprising padding a medium access control (MAC) protocol data unit (PDU) corresponding to the transport block such that no code block having a length less than the specific bit length is generated by segmenting the first CRC-attached transport block.

7. The method according to claim 1, wherein the second CRC-attached code blocks are sequentially mapped to the first number of layers or the second number of layers.

8. The method according to claim 1, wherein transmitting the layer-mapped code blocks comprises:
  scrambling and modulating the layer-mapped code blocks;
  performing precoding with respect to the scrambled and modulated code blocks; and transmitting the precoded code blocks.

9. A transmission device for transmitting a transport block, the device comprising:
  a first cyclic redundancy check (CRC) attacher configured to attach a first CRC to the transport block;
  a virtual layer segmenter configured to segment the first CRC-attached transport block into a specific number of code blocks;
  a second CRC attacher configured to attach a second CRC to each of the specific number of code blocks;
  a layer mapper configured to:

map the second CRC-attached code blocks to a first number of layers for initial transmission of the transport block; and map the second CRC-attached code blocks to a second number of layers for retransmission of the transport block; and a transmitter configured to transmit the layer-mapped code blocks to a reception device, wherein:

the specific number is a multiple of a least common multiple of the first number and the second number, the first number and the second number are different from each other;

the second CRC-attached code blocks are mapped to the first number of layers such that each of the first number of layers includes a first number of second CRC-attached code blocks; and the second CRC-attached code blocks are mapped to the second number of layers such that each of the second number of layers includes a second number of second CRC-attached code blocks.

10. The transmission device according to claim 9, further comprising:

a dummy bit attacher configured to attach a dummy bit to a front or rear of the transport block.

* * * * *